(12) United States Patent
Kringstad

(10) Patent No.: US 8,991,851 B1
(45) Date of Patent: Mar. 31, 2015

(54) TOWING SYSTEM

(71) Applicant: Burnell R. Kringstad, Park River, ND (US)

(72) Inventor: Burnell R. Kringstad, Park River, ND (US)

( * ) Notice: Subject to any disclaimer, the term of this patent is extended or adjusted under 35 U.S.C. 154(b) by 250 days.

(21) Appl. No.: 13/644,427

(22) Filed: Oct. 4, 2012

(51) Int. Cl.
*B60D 1/01* (2006.01)
*B60D 1/155* (2006.01)
*B60D 1/54* (2006.01)

(52) U.S. Cl.
CPC .. *B60D 1/01* (2013.01); *B60D 1/54* (2013.01); *B60D 1/155* (2013.01)
USPC ...... 280/504; 280/491.1; 280/491.3

(58) Field of Classification Search
CPC .............. B60D 1/01; B60D 1/30; B60D 1/54; B60D 1/155
USPC ............. 280/491.1, 491.3, 491.4, 504, 478.1, 280/515
See application file for complete search history.

(56) References Cited

U.S. PATENT DOCUMENTS

| | | | | |
|---|---|---|---|---|
| 1,848,956 A * | 3/1932 | Koehler | ............. | 280/491.3 |
| 2,240,886 A * | 5/1941 | Greiner | ............. | 280/490.1 |
| 2,382,449 A * | 8/1945 | Simmons | ............. | 280/405.1 |
| 2,459,458 A | 1/1949 | Schmitz | | |
| 2,529,686 A | 11/1950 | Green | | |
| 2,743,118 A * | 4/1956 | Dotson | ............. | 280/478.1 |
| 2,879,079 A * | 3/1959 | Edwards | ............. | 280/446.1 |
| 2,904,348 A * | 9/1959 | Quastad | ............. | 280/477 |
| 3,243,202 A * | 3/1966 | Carson | ............. | 280/479.2 |
| 3,489,432 A * | 1/1970 | Karlstrom | ............. | 280/504 |
| 3,572,750 A * | 3/1971 | Derr, Jr. | ............. | 280/455.1 |
| 3,649,048 A * | 3/1972 | Garnett | ............. | 280/477 |
| 4,015,855 A | 4/1977 | Murray | | |
| 4,389,058 A | 6/1983 | Cadwell | | |
| 4,418,936 A * | 12/1983 | Adams et al. | ............. | 280/493 |
| 4,420,169 A * | 12/1983 | Taylor | ............. | 280/446.1 |
| 4,711,461 A * | 12/1987 | Fromberg | ............. | 280/494 |
| 4,746,138 A | 5/1988 | James | | |
| 4,805,927 A * | 2/1989 | Stephenson et al. | ............. | 172/47 |
| 4,955,777 A * | 9/1990 | Ineson | ............. | 414/426 |
| 5,129,667 A * | 7/1992 | Gratton | ............. | 280/493 |
| 5,146,737 A * | 9/1992 | Gantzer | ............. | 56/14.9 |
| 5,193,625 A * | 3/1993 | Goll | ............. | 172/248 |
| 5,580,088 A * | 12/1996 | Griffith | ............. | 280/479.2 |
| 5,772,230 A | 6/1998 | Kemnitz | | |
| 6,357,778 B1 * | 3/2002 | Ross | ............. | 280/456.1 |
| 6,663,132 B1 * | 12/2003 | Kizy | ............. | 280/479.1 |
| 6,902,181 B1 * | 6/2005 | Dye | ............. | 280/478.1 |
| 7,004,489 B2 * | 2/2006 | Brown | ............. | 280/491.3 |
| 8,256,790 B2 * | 9/2012 | Fortner | ............. | 280/478.1 |
| 8,567,807 B2 * | 10/2013 | Su | ............. | 280/491.3 |

\* cited by examiner

*Primary Examiner* — Anne Marie Boehler
*Assistant Examiner* — Maurice Williams
(74) *Attorney, Agent, or Firm* — Michael S. Neustel

(57) ABSTRACT

A towing system for efficiently and safely pulling heavy vehicles. The towing system generally includes a first member adapted to be attached to a drawbar of a towing vehicle, a second member pivotally attached to the first member, a cam unit mechanically connected to the first member and second member providing a centering force to the second member, and a third member pivotally attached to the second member wherein the third member is adapted to removably attach to a vehicle to be towed. The third member is adapted to be pivoted upwardly into a raised storage position or downwardly to a lowered position by a pivot actuator connected between the third member and the second member.

23 Claims, 12 Drawing Sheets

TOWING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a vehicle towing system and more specifically it relates to a towing system for efficiently and safely pulling heavy vehicles.

2. Description of the Related Art

Any discussion of the related art throughout the specification should in no way be considered as an admission that such related art is widely known or forms part of common general knowledge in the field.

Pulling a vehicle is required when a vehicle has become stuck or has lost the ability to operate. Conventional vehicle towing systems involve using an elongated flexible member (e.g. ropes, chains or cables) along with hooks on opposing ends to pull a vehicle. With a conventional vehicle towing system, the user must manually attached a first end of the elongated flexible member to the towing vehicle (e.g. a tractor) and the second end to the towed vehicle (e.g. a truck).

One problem with conventional vehicle towing systems is that individuals are exposed to an inherently dangerous situation during connecting and disconnecting of the vehicles. Another problem with conventional vehicle towing systems is that they are time consuming to connected and disconnect. Another problem with conventional vehicle towing systems is the potential for breaking of the elongated flexible member. A further problem with conventional vehicle towing systems is the risk of physical injury when an elongated flexible member under tension breaks whether in the towing vehicle, the towed vehicle or near the towing area. Another problem with conventional vehicle towing systems is they are limited in the amount of tension they can handle requiring multiple towing systems to be used simultaneously.

Because of the inherent problems with the related art, there is a need for a new and improved towing system for efficiently and safely pulling heavy vehicles.

BRIEF SUMMARY OF THE INVENTION

The invention generally relates to a towing system which includes a first member adapted to be attached to a drawbar of a towing vehicle, a second member pivotally attached to the first member, a cam unit mechanically connected to the first member and second member providing a centering force to the second member, and a third member pivotally attached to the second member wherein the third member is adapted to removably attach to a vehicle to be towed. The third member is adapted to be pivoted upwardly into a raised storage position or downwardly to a lowered position by a pivot actuator connected between the third member and the second member.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
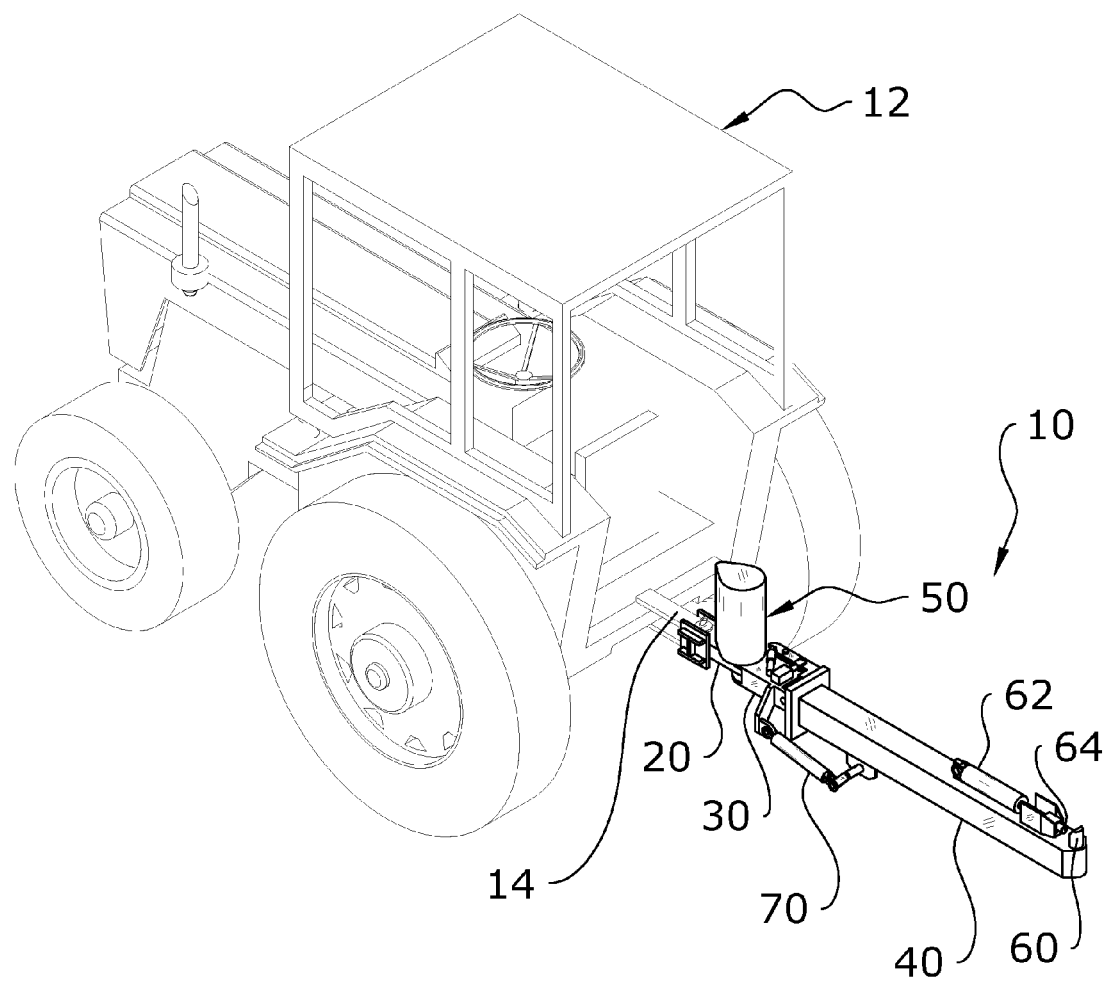
FIG. 1 is an upper perspective view of the present invention connected to a towing vehicle in a lowered position.

A. Overview.

Turning now descriptively to the drawings, in which similar reference characters denote similar elements throughout the several views, FIGS. 1 through 9c illustrate a towing system 10, which comprises a first member 20 adapted to be attached to a drawbar 14 of a towing vehicle 12, a second member 30 pivotally attached to the first member 20, a cam unit 50 mechanically connected to the first member 20 and second member 30 providing a centering force to the second member 30, and a third member 40 pivotally attached to the second member 30 wherein the third member 40 is adapted to removably attach to a vehicle to be towed. The third member 40 is adapted to be pivoted upwardly into a raised storage position or downwardly to a lowered position by a pivot actuator 70 connected between the third member 40 and the second member 30. U.S. Pat. No. 5,772,230 to Kemnitz titled "Towing Apparatus" is hereby incorporated by reference herein.

B. First Member.

As best illustrated in FIGS. 1 through 7 of the drawings, a first member 20 is adapted to be attached to a drawbar 14 of a towing vehicle 12 (e.g. a tractor). The first member 20 includes a first aperture 22 that is aligned with the aperture within the clevis of the drawbar 14 and receives a corresponding pin that extends through the drawbar 14 and the first member 20. The first member 20 is preferably comprised of a solid metal bar that fits between the upper and lower portions of a clevis of the drawbar 14 as illustrated in FIGS. 1, 9a through 9c of the drawings. The first member 20 preferably has a thickness that provides a relatively snug fit within the clevis of the drawbar 14 to reduce upward and downward movement of the first member 20. The first member 20 also preferably has a width approximately equal to the width of the clevis of the drawbar 14.

The first member 20 is preferably connected to the drawbar 14 in a substantially non-movable manner to prevent side-to-side movement of the first member 20. A first plate 24 and a second plate 25 are adapted to be secured on opposite sides of the first member 20 and adjacent to the drawbar 14 to prevent movement of the first member 20 with respect to the drawbar 14 of the towing vehicle 12 as illustrated in FIGS. 1 through 3b of the drawings. The first plate 24 and the second plate 25 are parallel to one another along a vertical plane as illustrated in FIGS. 1 through 3b of the drawings.

The first plate 24 and second plate 25 may be permanently or removably attached to the first member 20. If the first plate 24 and the second plate 25 are removably attached, horizontally extending apertures within the first member 20 receive first fasteners 26 that extend through the first plate 24 and the second plate 25 (with corresponding fastening nuts secured at the distal threaded ends). Securing the first plate 24 and the second plate 25 about the clevis of the drawbar 14 and the first member 20 further prevents movement of the first member 20 with respect to the drawbar 14 of the towing vehicle 12.

C. Second Member.

Figure 3A:
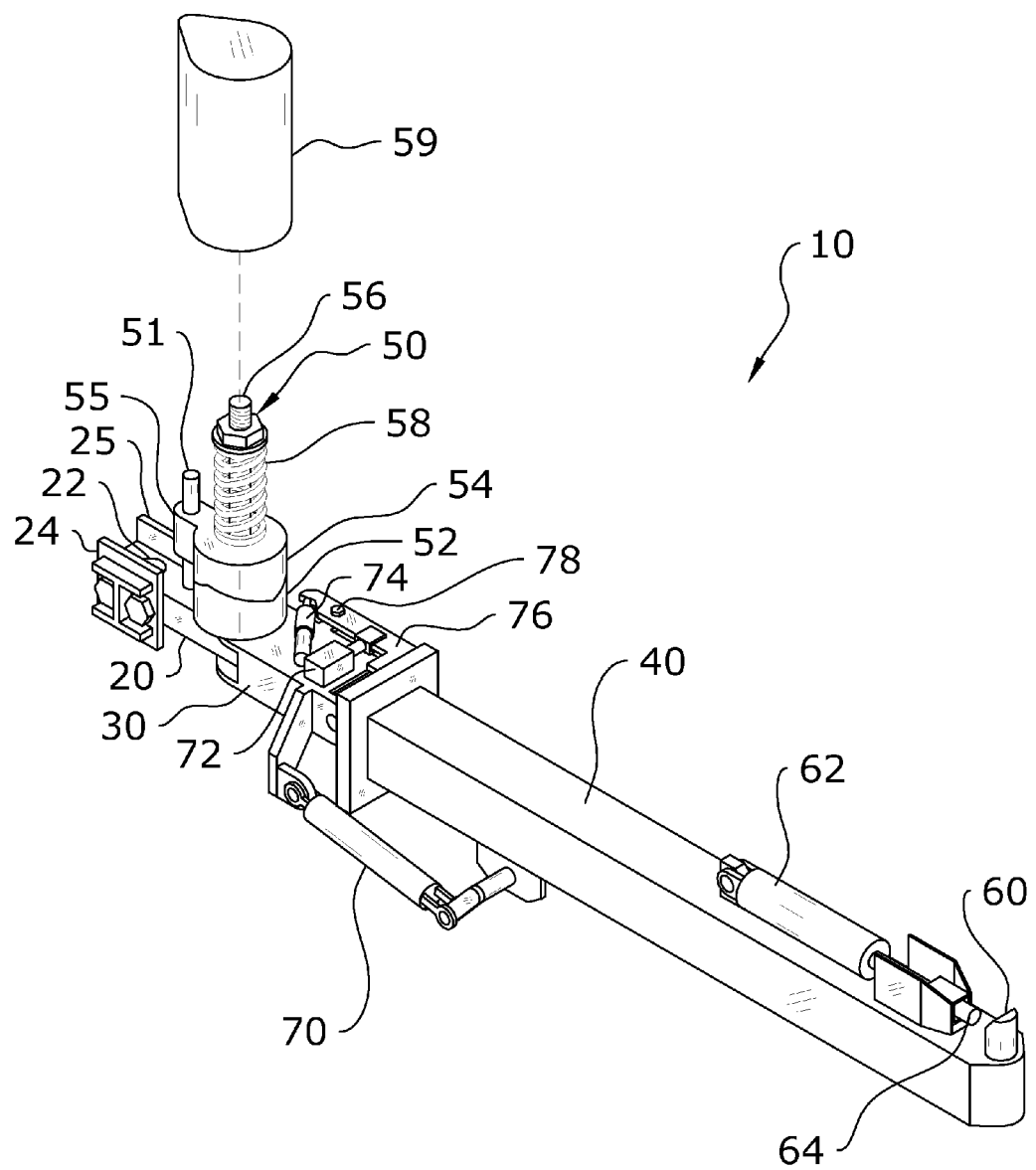
FIG. 3a is an upper perspective view of the present invention in the lowered position with the cam cover removed.
Figure 3B:
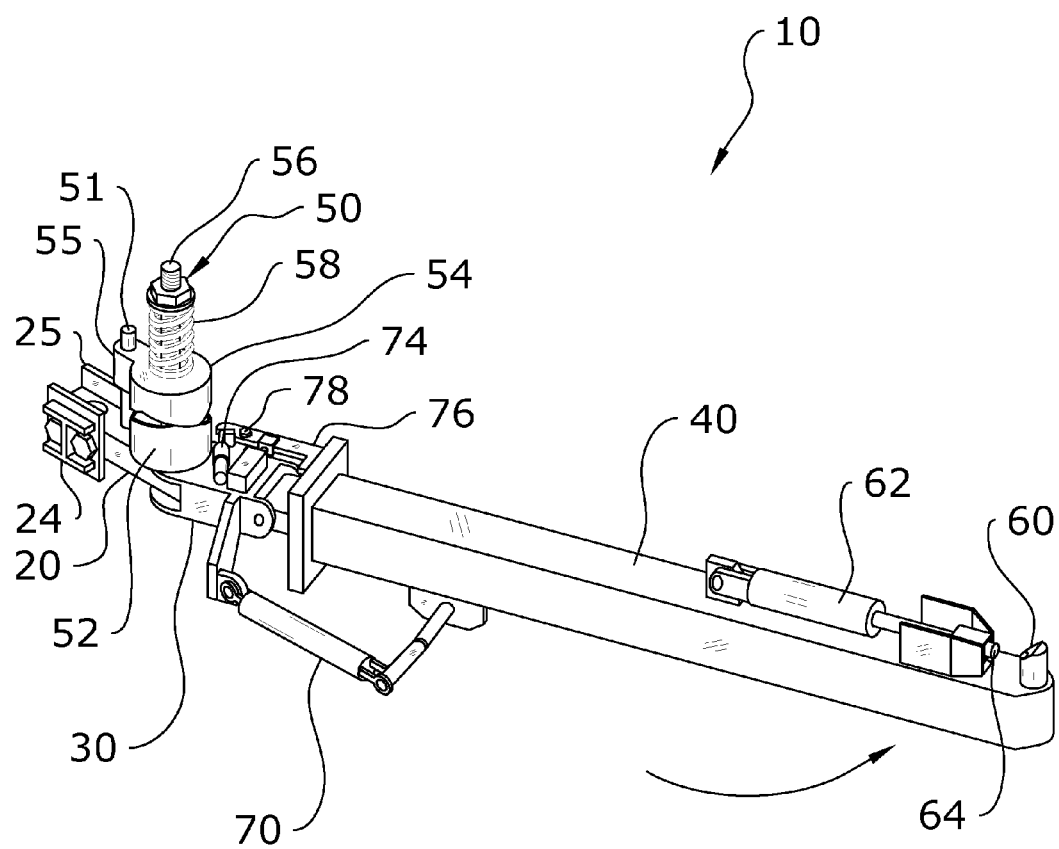
FIG. 3b is an upper perspective view of the present invention in the lowered position and in a pivoted position.

The second member 30 is pivotally attached to the first member 20 by a first hinge 32 and is adapted to be pivoted along a horizontal plane about a vertical axis as illustrated in FIGS. 3a and 3b of the drawings. The pivoting of the second member 30 allows for turning by the towing vehicle 12 when pulling a towed vehicle 16. The second member 30 is preferably center biased to remain aligned with the first member 20 to ensure that the present invention is easily aligned with a towed vehicle 16 for connecting to the towed vehicle 16 which is discussed herein.

D. Cam Unit.

Figure 2:
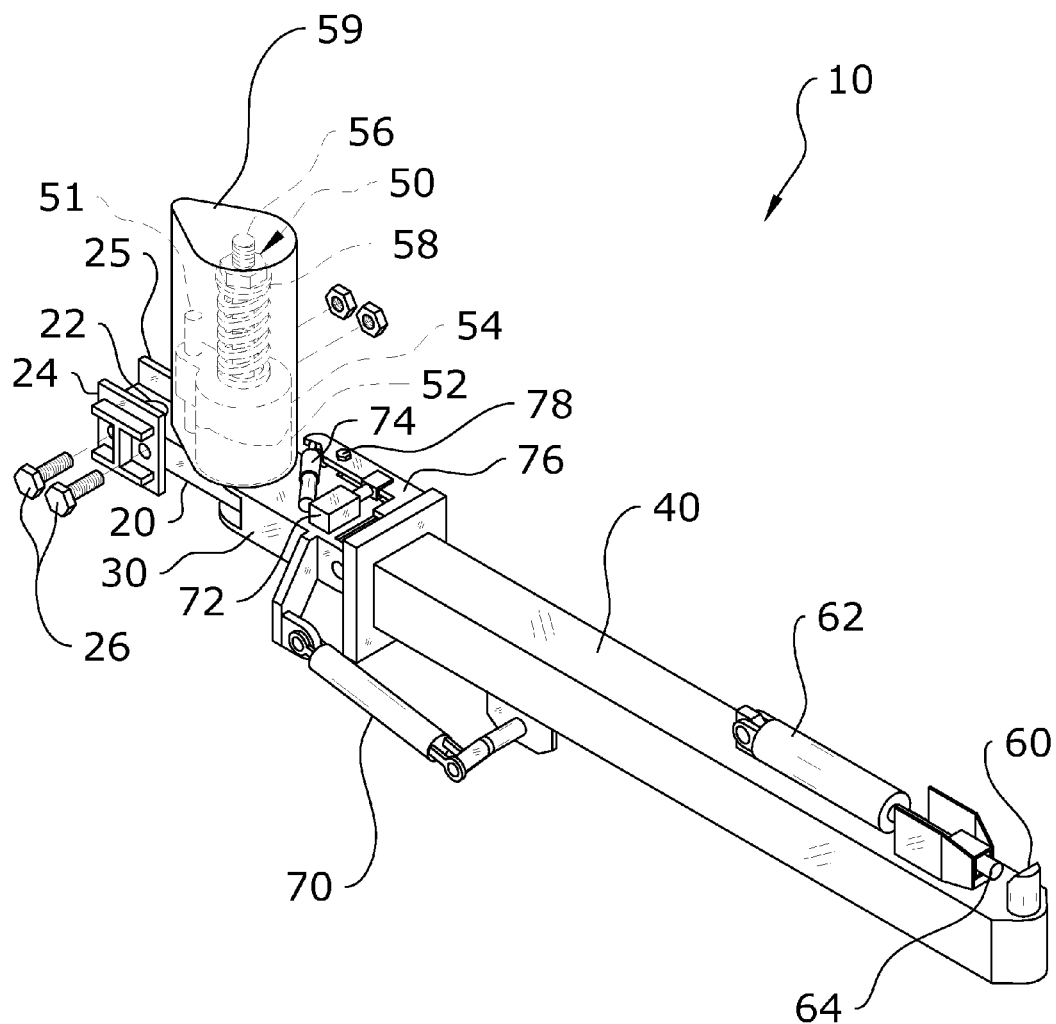
FIG. 2 is an upper perspective view of the present invention.

A cam unit 50 is mechanically connected to the first member 20 and second member 30 providing a centering force to the second member 30. The centering force retains the second member 30 aligned with the first member 20 (preferably aligned longitudinally with the towing vehicle 12). The centering force preferably manipulates the second member 30 into substantial longitudinal alignment with the first member 20 as illustrated in FIGS. 2 and 3a of the drawings.

Figure 4:
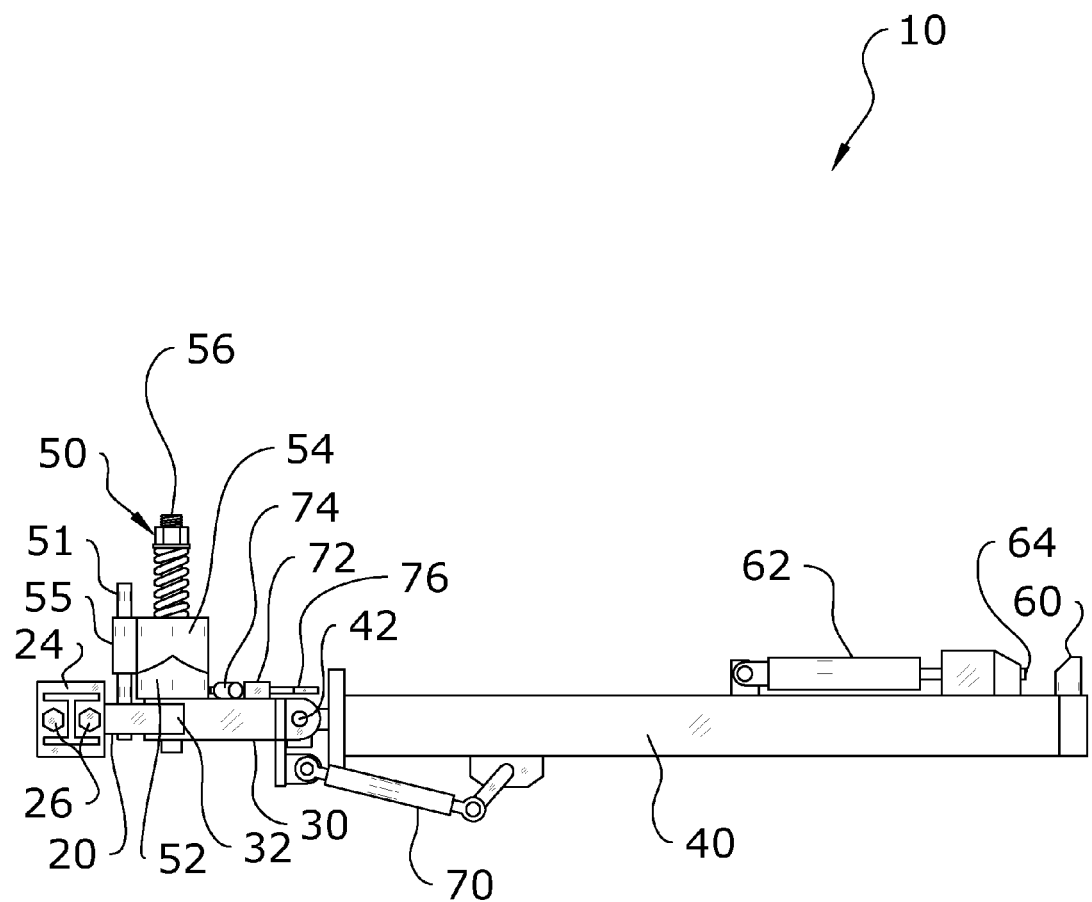
FIG. 4 is a side view of the present invention in the lowered position.
Figure 5:
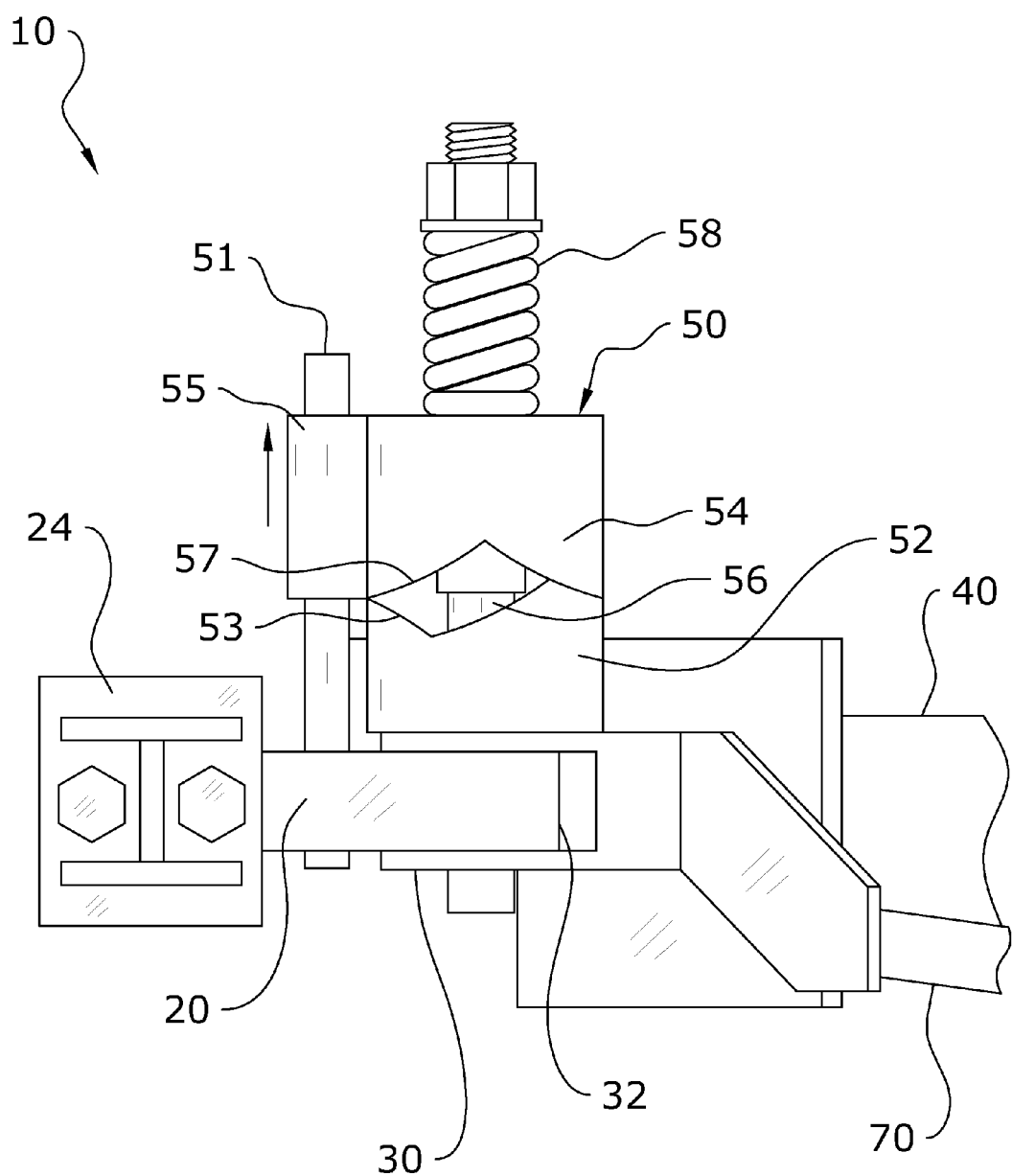
FIG. 5 is a side view illustrating the cam unit when the present invention is pivoted along a horizontal plane.

The cam unit 50 includes an upper cam 54 having a lower surface 57 and a lower cam 52 having an upper surface 53 as illustrated in FIG. 5 of the drawings. The lower surface 57 and the upper surface 53 slidably engage one another. The lower surface 57 mirrors the upper surface 53 such that when the second member 30 is aligned with the first member 20, the lower surface 57 and the upper surface 53 are fully connected as illustrated in FIGS. 3a and 4 of the drawings to prevent pivoting of the second member 30 without a significant force applied to the second member 30. The lower surface 57 is preferably comprised of an inverted V-shaped cross section defining a V-shaped channel and the upper surface 53 is preferably comprised of a V-shaped cross section that mirrors the lower surface 57 as illustrated in FIGS. 3a, 3b and 5 of the drawings. The lower surface 57 and the upper surface 53 preferably are curved to facilitate a gradual elevation of the upper cam 54 as the lower cam 52 is rotated respectively as best illustrated in FIG. 5 of the drawings. When the second member 30 is not aligned with the first member 20, the lower surface 57 does not fully connect with the upper surface 53 thereby applying the centering force to reposition the cam unit 50 and the second member 30 back to the original centered position. The upper cam 54 moves upwardly against the bias member 58 when the second member 30 is not aligned with the first member 20 as illustrated in FIGS. 3b and 5 of the drawings.

The upper cam 54 is preferably concentric with respect to the lower cam 52 along a common vertical axis. A center shaft 56 preferably extends upwardly from the first member 20 through the lower cam 52 and the upper cam 54 as illustrated in FIGS. 3a through 5 of the drawings. The upper cam 54 preferably slides upon the center shaft 56 and the lower cam 52 is preferably stationary with respect to second member 30. The lower cam 52 is preferably attached to the second member 30 and rotates with the second member 30 about the center shaft 56. The center shaft 56 preferably extends upwardly through the first member 20 and the second member 30 to form the pivot axis for the second member 30 with respect to the first member 20.

The upper cam 54 and the lower cam 52 are biased towards one another by a bias member 58. The bias member 58 is preferably comprised of a compression spring positioned upon the center shaft 56 above the upper cam 54, wherein the bias member 58 is adapted to apply a downward force upon the upper cam 54. The compression spring is concentrically positioned about the center shaft 56 and is allowed to move along the center shaft 56. A fastening nut is preferably threadably attached to male threading upon the upper portion of the center shaft 56 thereby allowing the user to adjust the amount of compression force applied to the upper cam 54 as illustrated in FIGS. 3a through 5 of the drawings.

A guide shaft 51 extends upwardly from the first member 20 as best illustrated in FIGS. 4 and 5 of the drawings. The guide shaft 51 is preferably parallel with respect to the center shaft 56. The upper cam 54 is slidably connected to the guide shaft 51 to prevent rotation of the upper cam 54 with respect to the first member 20 as the lower cam 52 is rotated. The upper cam 54 preferably includes a guide arm 55 that extends outwardly, wherein the guide arm 55 is slidably connected to the guide shaft 51 and provides leverage to prevent rotation of the upper cam 54 during operation. A cam cover 59 comprised of a tubular structure with a lower opening is removably positioned over the lower cam 52 and the upper cam 54 to prevent physical injury or contamination of the cam unit 50.

E. Third Member.

The third member 40 is pivotally attached to the second member 30 by a second hinge 42 as illustrated in FIGS. 1 through 4 and 7 of the drawings. The third member 40 may have various lengths, but it is preferable that the third member 40 have a length of at least 5 feet or more to provide sufficient distance between the towing vehicle 12 and the towed vehicle 16.

Figure 7:
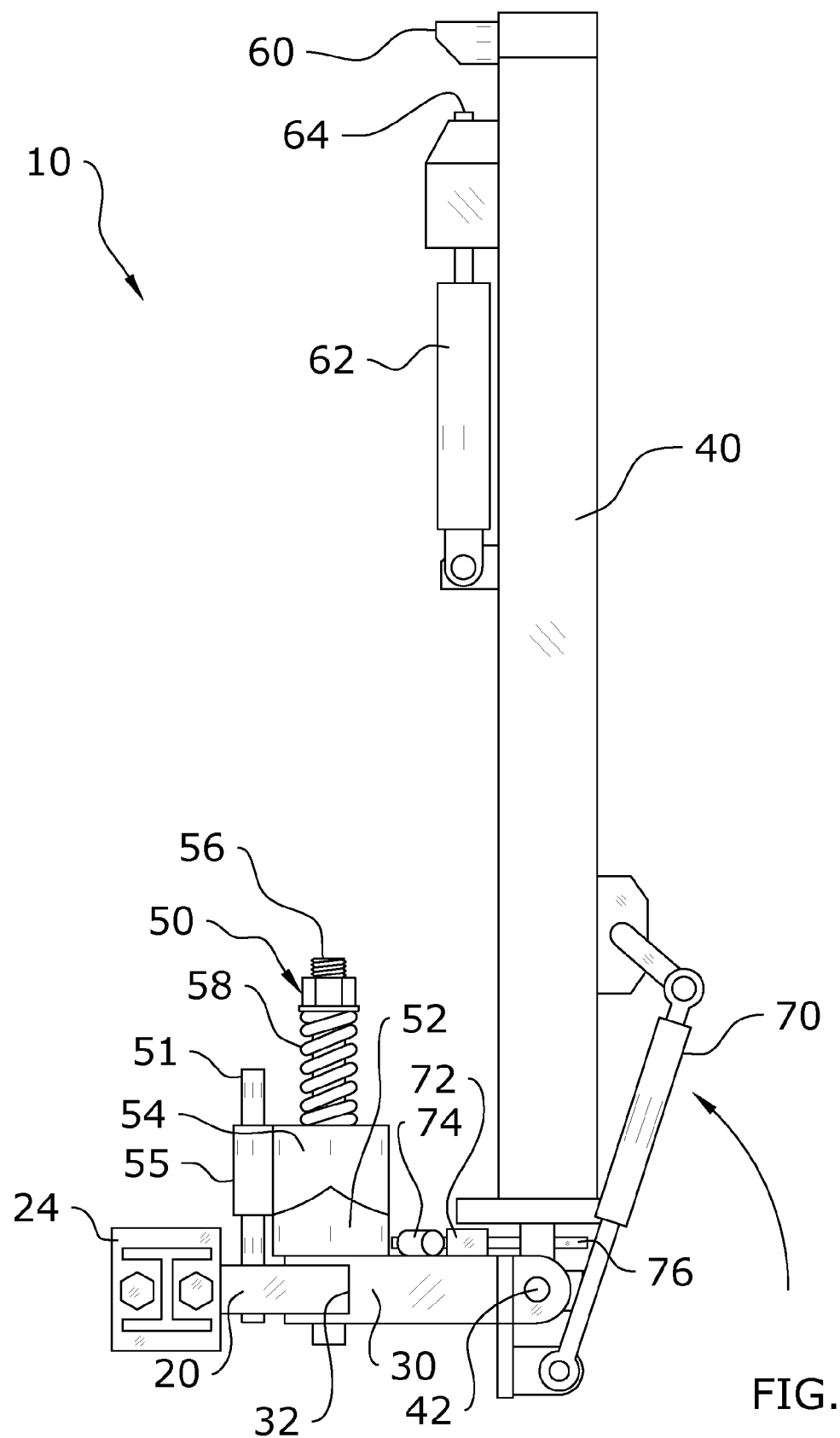
FIG. 7 is a side view of the present invention in the raised storage position.
Figure 8:
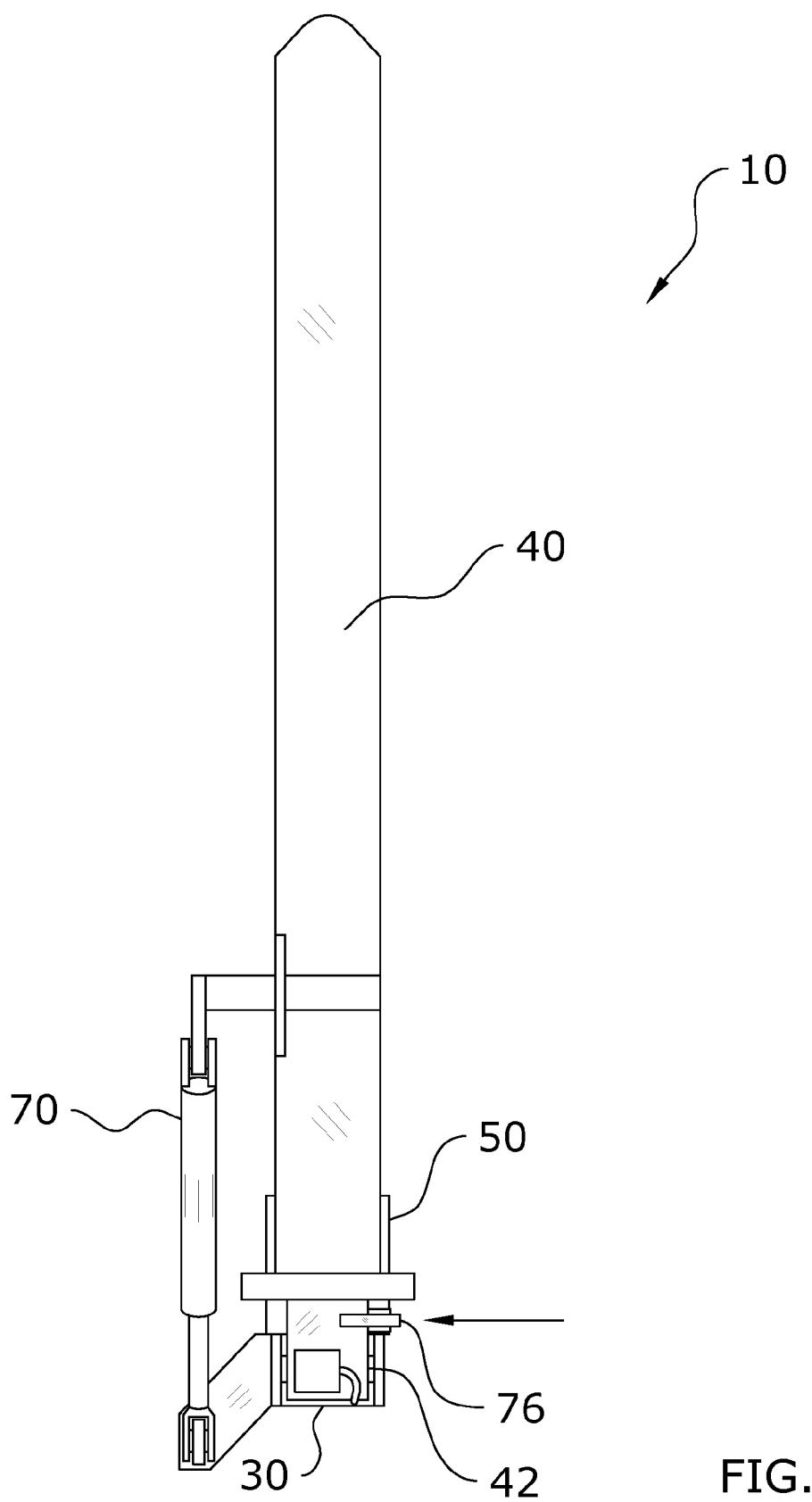
FIG. 8 is rear end view of the present invention in the raised storage position with the locking arm positioned in the locked position to prevent accidental lowering of the arm.
Figure 9A:
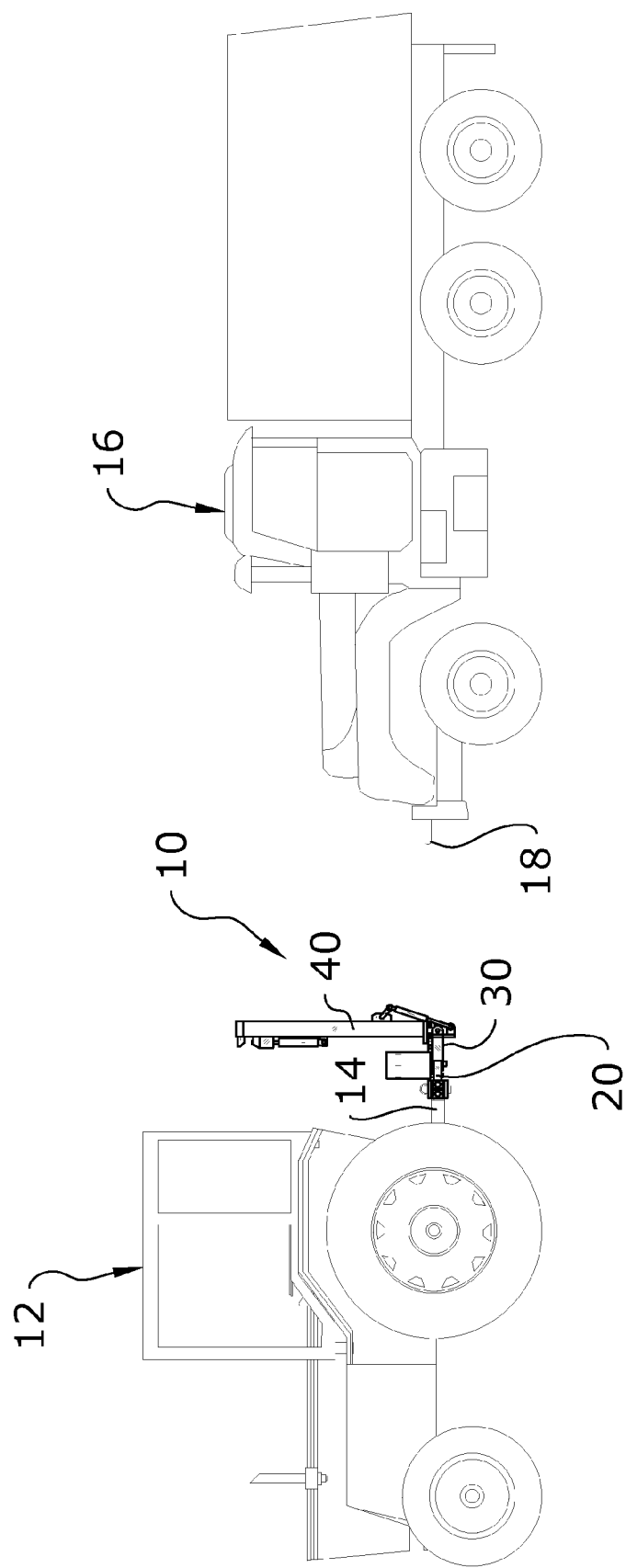
FIG. 9a is a side view of the present invention attached to a towing vehicle in the raised position prior to connecting to a vehicle to be towed.
Figure 9B:
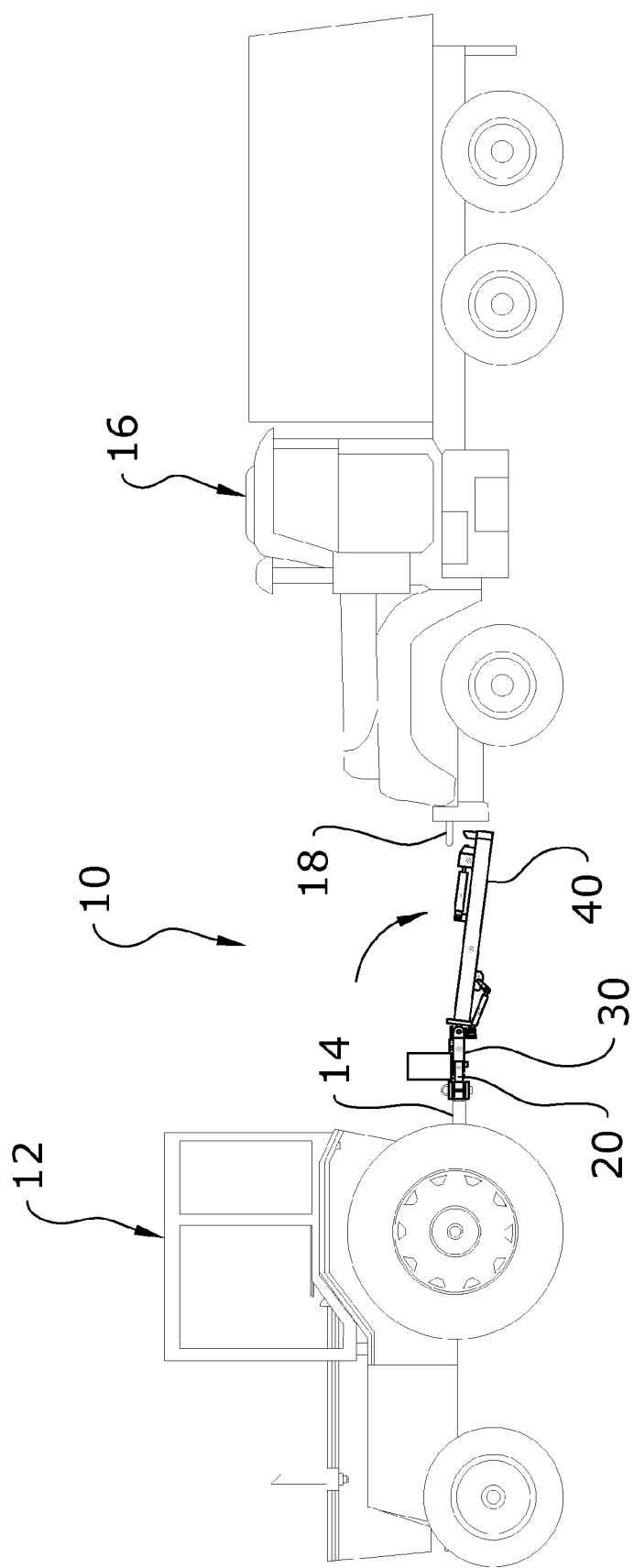
FIG. 9b is a side view of the present invention in the lowered position approaching the vehicle to be towed.
Figure 9C:
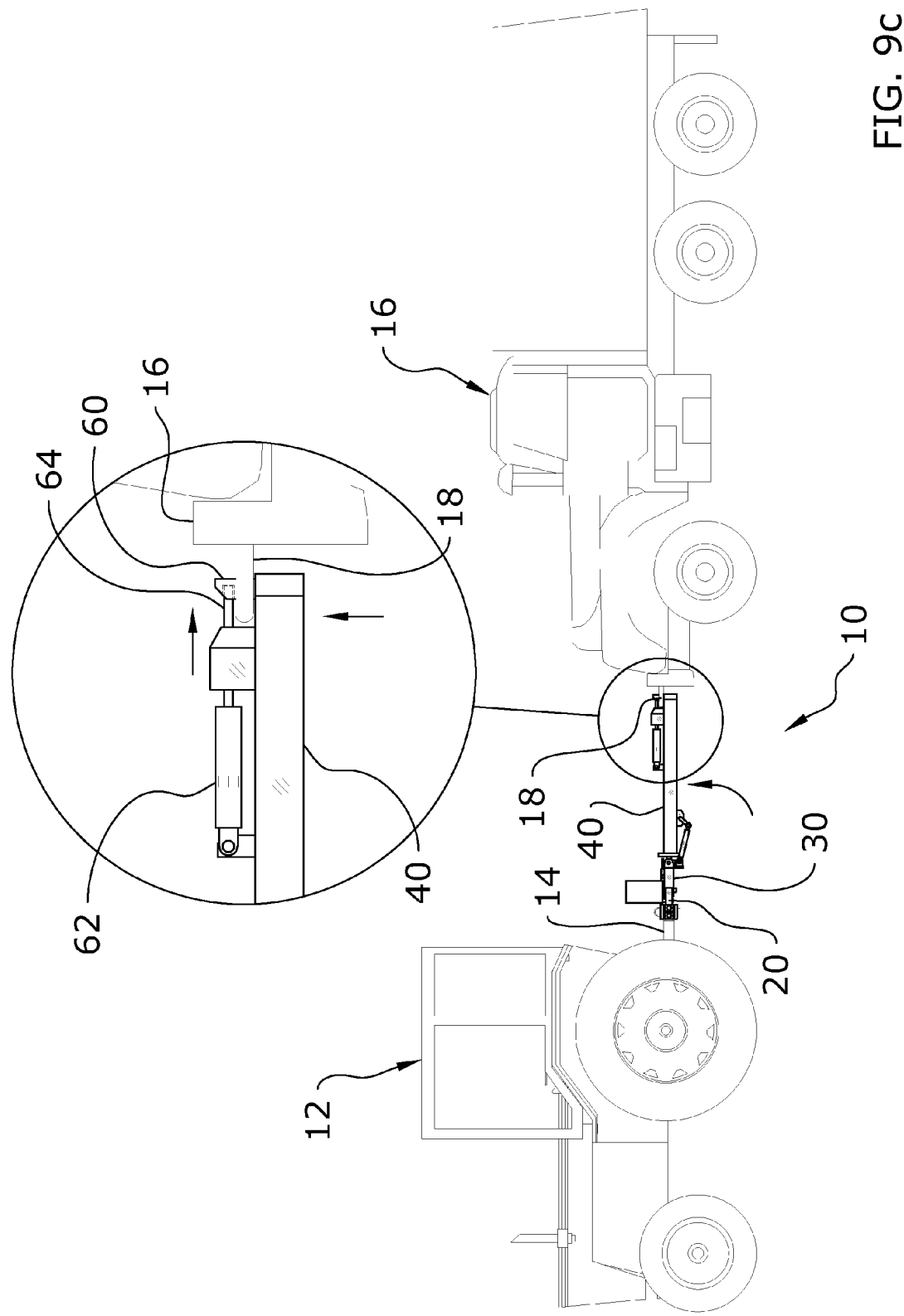
FIG. 9c is a side view of the present invention connected between the towing vehicle and the towed vehicle.

The third member 40 is adapted to be removably attached to a towed vehicle 16 utilizing a catch unit. The third member 40 is adapted to be pivoted upwardly into a raised storage position as illustrated in FIGS. 7, 8 and 9a of the drawings and downwardly to a lowered position as illustrated in FIGS. 1 through 6, 9b and 9c of the drawings. The raised storage position is for transporting the present invention upon the towing vehicle 12 without the present invention extending outwardly.

A pivot actuator 70 is connected between the third member 40 and the second member 30 to pivot the third member 40 between the raised storage position and the lowered position. The pivot actuator 70 may be comprised of various types of actuators such as but not limited to a hydraulic cylinder. The pivot actuator 70 is distally spaced outwardly from a side of the third member 40 to avoid engagement with the second member 30 and the third member 40 during the lifting of the third member 40. Extended members from the third member 40 and the second member 30 are used to distally space the pivot actuator 70 away from the same as best illustrated in FIGS. 2 and 3a of the drawings. The pivot actuator 70 may be fluidly connected to the hydraulic system of the towing vehicle 12 to provide pressurized hydraulic fluid.

F. Locking Arm.

Figure 6:
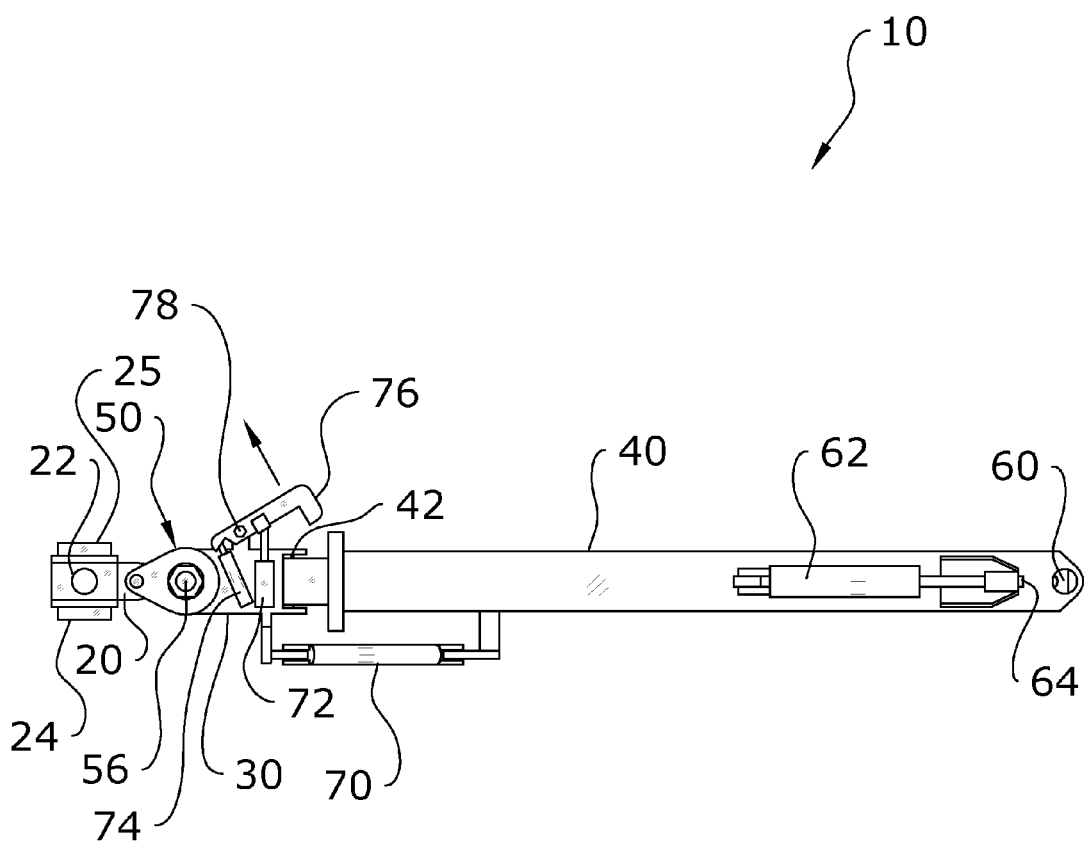
FIG. 6 is a top view of the present invention illustrating the release of the locking arm to allow for folding of the present invention into the raised storage position.

A locking arm 76 is pivotally connected to the second member 30 by a pivot pin 78 as illustrated in FIGS. 1 and 6 of the drawings. The locking arm 76 is adapted to be moved into a locked position to secure the third member 40 in the raised storage position as best illustrated in FIG. 8 of the drawings. The locking arm 76 is preferably comprised of an L-shaped structure that extends across at least a portion of the second member 30 when in the retracted position (FIG. 3a) and that is positioned away from the second member 30 when in the extended position (FIG. 6). A locking actuator 72 is connected between the second member 30 and the locking arm 76, wherein the locking actuator 72 may be comprised of a hydraulic cylinder. A bias unit 74 is connected between the second member 30 and a cantilever portion of the locking arm 76 to provide a retraction force to the locking arm 76 such that when hydraulic pressure is relieved from the locking actuator 72 the bias unit 74 is able to force the locking arm 76 into the retracted position as shown in FIGS. 3a and 8 of the drawings.

G. Catch Unit.

FIGS. 1 through 4, 6 through 9c illustrate an exemplary catch unit attached to a distal portion of the third member 40 that is adapted to catchably and releasably engage a hitch 18 of the towed vehicle 16. The catch unit is comprised of a catch member 60 that extends upwardly from the distal end of the third member 40 and that is extendable through a hitch 18 (e.g. a loop) attached to a front end of the towed vehicle 16. An outer actuator 62 (e.g. hydraulic cylinder) is attached to the third member 40 that selected extends and retracts an engaging member 64 to engage the catch member 60. When the engaging member 64 is fully extended, the catch member 60 is prevented from escaping from the hitch 18 of the towed vehicle 16. When the engaging member 64 is retracted, the catch member 60 is allowed to be lowered from the hitch 18 thereby releasing the present invention from the towed vehicle 16. U.S. Pat. No. 5,772,230 to Kemnitz illustrates an exemplary catch unit and is incorporated by reference herein to disclose the catch unit.

H. Operation of Preferred Embodiment.

In use, the user connects the first member 20 to the drawbar 14 of the towing vehicle 12 using a pin and by attaching the plates 24, 25 about the sides thereof. The actuators of the present invention are further fluidly connected to the hydraulics of the towing vehicle 12. The hydraulics of the present invention preferably are fluidly connected to a hydraulic control unit that controls the flow of hydraulic fluid. The operator of the towing vehicle 12 then activates the pivot actuator 70 to lift the third member 40 into the raised storage position. Prior to the third member 40 being raised, the hydraulic control unit causes the locking actuator 72 to extend the locking arm 76 outwardly upon the pivot pin 78 thereby allowing the raising of the third member 40 as illustrated in FIG. 6 of the drawings. Once the locking actuator 72 is fully extended, the hydraulic control unit causes the hydraulic fluid to extend the pivot actuator 70 thereby raising the third member 40 as illustrated in FIG. 7 of the drawings. After the third member 40 is fully raised and the user deactivates lifting, the hydraulic control unit releases the pressure from the locking actuator 72 and the bias unit 74 thereby forces the locking arm 76 back to the original refracted position thereby preventing accidental lowering of the third member 40 as illustrated in FIGS. 7 and 8 of the drawings. If the third member 40 begins to lower with the locking arm 76 in the retracted position, the inner end of the third member 40 eventually engages the locking arm 76 and is prevented from pivoting downwardly further. Once the third member 40 is preferably secured, the operator of the towing vehicle 12 is able to drive to the location of the vehicle to be towed (e.g. a truck stuck in a vehicle, etc.). The cam unit 50 ensures that the second and third member 40 do not freely pivot with respect to the first member 20.

The operator of the towing vehicle 12 pulls in front of the towed vehicle 16 as illustrated in FIG. 9a of the drawings. The third member 40 is lowered which causes the locking arm 76 to be extended outwardly before lowering the third member 40. Once the third member 40 is lowered to a desired level that allows for the upper end of the catch member 60 to pass under the hitch 18 of the towed vehicle 16, the towing vehicle 12 then moves rearwardly until the catch member 60 is positioned beneath the opening within the hitch 18 (the hitch 18 may be comprised of a loop or similar structure). As the towing vehicle 12 moves rearwardly, the cam unit 50 ensures that the second and third member 40 do not freely pivot with respect to the first member 20. The cam unit 50 provides a counter force to any pivot force applied by the third member 40 in an attempt to keep the second member 30 and the third member 40 centrally aligned with the first member 20. The user then lifts the third member 40 upwardly so that the catch member 60 extends through the opening within the hitch 18 and then activates the outer actuator 62 to cause the engaging member 64 to extend towards the catch member 60 thereby catchably engaging the towed vehicle 16. The towing vehicle 12 is then able to pull the towed vehicle 16 as desired. When turning by the towing vehicle 12 is required, the cam unit 50 allows for pivoting of the second member 30 with respect to the first member 20.

When towing is completed, the outer actuator 62 retracts the engaging member 64 and the third member 40 is lowered so that the catch member 60 is released from the hitch 18 of the towed vehicle 16. The towing vehicle 12 pulls forwardly and then the third member 40 is returned to the raised storage position.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A towing apparatus, comprising:
   a first member adapted to be attached to a drawbar of a towing vehicle in a substantially non-movable manner;
   a second member pivotally attached to said first member, wherein said second member is adapted to be pivoted along a horizontal plane;
   a cam unit mechanically connected to said first member and second member providing a centering force to said second member, wherein said centering force is comprised of a counter force to any pivot force applied to said second member to keep said second member aligned with said first member;
   a third member pivotally attached to said second member wherein said third member is adapted to be removably attached to a towed vehicle, wherein said third member is adapted to be pivoted upwardly into a raised storage position and downwardly to a lowered position; and
   a catch member attached to a distal portion of said third member, wherein said catch member is adapted to catchably engage a hitch of the towed vehicle.

2. The towing apparatus of claim 1, wherein said centering force manipulates said second member into substantial longitudinal alignment with said first member.

3. The towing apparatus of claim 1, including a pivot actuator connected between said third member and said second member.

4. The towing apparatus of claim 3, wherein said pivot actuator is distally spaced outwardly from a side of said third member.

5. The towing apparatus of claim 1, wherein said cam unit includes an upper cam having a lower surface and a lower cam having an upper surface, wherein said lower surface and said upper surface slidably engage one another.

6. The towing apparatus of claim 5, wherein said upper cam and said lower cam are biased towards one another by a bias member.

7. The towing apparatus of claim 6, including a center shaft extending from said first member through said lower cam and said upper cam, wherein said upper cam slides upon said center shaft and wherein said lower cam is stationary with respect to second member.

8. The towing apparatus of claim 6, wherein said bias member is comprised of a compression spring.

9. The towing apparatus of claim 6, wherein said bias member is positioned upon said center shaft above said upper cam, wherein said bias member is adapted to apply a downward force upon said upper cam.

10. The towing apparatus of claim 5, wherein said lower surface mirrors said upper surface.

11. The towing apparatus of claim 10, wherein said lower surface is comprised of a V-shaped cross section.

12. The towing apparatus of claim 5, including a guide shaft extending upwardly from said first member and wherein said upper cam is slidably connected to said guide shaft to prevent rotation of said upper cam with respect to said first member.

13. The towing apparatus of claim 12, wherein said upper cam includes a guide arm extending outwardly, wherein said guide arm is slidably connected to said guide shaft.

14. The towing apparatus of claim 1, including a locking arm pivotally connected to said second member and a locking actuator connected between said second member and said locking arm, wherein said locking arm is adapted to be moved into a locked position to secure said third member in said raised storage position.

15. A towing apparatus, comprising:
   a first member adapted to be attached to a drawbar of a towing vehicle in a substantially non-movable manner;
   a first plate and a second plate adapted to be secured on opposite sides of said first member and adjacent to the drawbar to prevent movement of the first member with respect to the drawbar of the towing vehicle;
   a second member pivotally attached to said first member, wherein said second member is adapted to be pivoted along a horizontal plane;
   a cam unit mechanically connected to said first member and second member providing a centering force to said second member, wherein said centering force is comprised of a counter force to any pivot force applied to said second member to keep said second member aligned with said first member;
   a third member pivotally attached to said second member wherein said third member is adapted to be removably attached to a towed vehicle, wherein said third member is adapted to be pivoted upwardly into a raised storage position and downwardly to a lowered position; and
   a catch member attached to a distal portion of said third member, wherein said catch member is adapted to catchably engage a hitch of the towed vehicle.

16. The towing apparatus of claim 15, wherein said centering force manipulates said second member into substantial longitudinal alignment with said first member.

17. The towing apparatus of claim 15, including a pivot actuator connected between said third member and said second member.

18. The towing apparatus of claim 15, wherein said cam unit includes an upper cam having a lower surface and a lower cam having an upper surface, wherein said lower surface and said upper surface slidably engage one another.

19. The towing apparatus of claim 15, including a locking arm pivotally connected to said second member and a locking actuator connected between said second member and said locking arm, wherein said locking arm is adapted to be moved into a locked position to secure said third member in said raised storage position.

20. A towing apparatus, comprising:
   a first member adapted to be attached to a drawbar of a towing vehicle in a substantially non-movable manner;
   a first plate and a second plate adapted to be secured on opposite sides of said first member and adjacent to the drawbar to prevent movement of the first member with respect to the drawbar of the towing vehicle;
   a second member pivotally attached to said first member, wherein said second member is adapted to be pivoted along a horizontal plane;
   a cam unit mechanically connected to said first member and second member providing a centering force to said second member;
   wherein said cam unit includes an upper cam having a lower surface and a lower cam having an upper surface, wherein said lower surface and said upper surface slidably engage one another;
   wherein said centering force manipulates said second member into substantial longitudinal alignment with said first member;
   a third member pivotally attached to said second member wherein said third member is adapted to be removably attached to a towed vehicle, wherein said third member is adapted to be pivoted upwardly into a raised storage position and downwardly to a lowered position;
a pivot actuator connected between said third member and said second member; and
a catch member attached to a distal portion of said third member, wherein said catch member is adapted to catchably engage a hitch of the towed vehicle.

21. A towing apparatus, comprising:
a first member adapted to be attached to a drawbar of a towing vehicle in a substantially non-movable manner;
a second member pivotally attached to said first member, wherein said second member is adapted to be pivoted along a horizontal plane;
a cam unit mechanically connected to said first member and second member providing a centering force to said second member;
a third member pivotally attached to said second member wherein said third member is adapted to be removably attached to a towed vehicle, wherein said third member is adapted to be pivoted upwardly into a raised storage position and downwardly to a lowered position;
a catch member attached to a distal portion of said third member, wherein said catch member is adapted to catchably engage a hitch of the towed vehicle; and
a pivot actuator connected between said third member and said second member, wherein said pivot actuator is distally spaced outwardly from a side of said third member.

22. A towing apparatus, comprising:
a first member adapted to be attached to a drawbar of a towing vehicle in a substantially non-movable manner;
a second member pivotally attached to said first member, wherein said second member is adapted to be pivoted along a horizontal plane;
a cam unit mechanically connected to said first member and second member providing a centering force to said second member, wherein said cam unit includes an upper cam having a lower surface and a lower cam having an upper surface, wherein said lower surface and said upper surface slidably engage one another;
a third member pivotally attached to said second member wherein said third member is adapted to be removably attached to a towed vehicle, wherein said third member is adapted to be pivoted upwardly into a raised storage position and downwardly to a lowered position; and
a catch member attached to a distal portion of said third member, wherein said catch member is adapted to catchably engage a hitch of the towed vehicle.

23. A towing apparatus, comprising:
a first member adapted to be attached to a drawbar of a towing vehicle in a substantially non-movable manner;
a second member pivotally attached to said first member, wherein said second member is adapted to be pivoted along a horizontal plane;
a cam unit mechanically connected to said first member and second member providing a centering force to said second member;
a third member pivotally attached to said second member wherein said third member is adapted to be removably attached to a towed vehicle, wherein said third member is adapted to be pivoted upwardly into a raised storage position and downwardly to a lowered position;
a catch member attached to a distal portion of said third member, wherein said catch member is adapted to catchably engage a hitch of the towed vehicle; and
a locking arm pivotally connected to said second member and a locking actuator connected between said second member and said locking arm, wherein said locking arm is adapted to be moved into a locked position to secure said third member in said raised storage position.

* * * * *